（12）United States Patent
Hsieh

(10) Patent No.: US 11,041,300 B2
(45) Date of Patent: *Jun. 22, 2021

(54) COOLING APPARATUS OF REGULATING TANK

(71) Applicant: KUAN YUAN PAPER MFG. CO., LTD., Miaoli (TW)

(72) Inventor: Kuang Yuan Hsieh, Miaoli (TW)

(73) Assignee: KUAN YUAN PAPER MFG. CO., LTD., Zhunan Township (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/831,735

(22) Filed: Mar. 26, 2020

(65) Prior Publication Data

US 2020/0308819 A1 Oct. 1, 2020

(30) Foreign Application Priority Data

Mar. 29, 2019 (TW) .................................. 108111120

(51) Int. Cl.
*E03F 5/10* (2006.01)
*E03B 1/04* (2006.01)

(52) U.S. Cl.
CPC ................ *E03F 5/10* (2013.01); *E03B 1/042* (2013.01)

(58) Field of Classification Search
None
See application file for complete search history.

(56) References Cited

U.S. PATENT DOCUMENTS

| 2,355,760 | A | * | 8/1944 | Trebler | ..................... C02F 3/04 210/128 |
| 2,878,939 | A | * | 3/1959 | Aldrich | ................ B01D 21/003 210/202 |
| 2,901,114 | A | * | 8/1959 | Smith | .................... C02F 3/1242 210/200 |
| 3,214,021 | A | * | 10/1965 | Applebaum | ........... B01D 24/22 210/108 |
| 3,220,706 | A | * | 11/1965 | Valdespino | ................ C02F 3/12 261/18.1 |
| 3,465,889 | A | * | 9/1969 | Young, Jr. | ........... B01D 21/2444 210/538 |
| 3,717,257 | A | * | 2/1973 | Boyle | ................ B01D 21/2433 210/521 |

(Continued)

FOREIGN PATENT DOCUMENTS

| CN | 107215939 A | 9/2017 |
| CN | 206529306 U | 9/2017 |

OTHER PUBLICATIONS

Office Action of corresponding TW application 108111120, published on Nov. 18, 2019.

(Continued)

*Primary Examiner* — Robert J Popovics
(74) *Attorney, Agent, or Firm* — Wang Law Firm, Inc.

(57) ABSTRACT

A regulating tank includes a tank member having an annular wall to receive wastewater. A circular pipe is connected to the tank member. A draining device drains the wastewater in the tank member to the circular pipe. A plurality of nozzles connected to the circular pipe to eject the wastewater in the circular pipe back to the tank member. When the wastewater is ejected by the nozzles, a temperature of the wastewater is reduced, and dissolved oxygen of the wastewater is increased.

7 Claims, 6 Drawing Sheets

(56) References Cited

U.S. PATENT DOCUMENTS

| | | | | |
|---|---|---|---|---|
| 3,891,557 A * | 6/1975 | Edgerton | ........... | B01D 21/2405 |
| | | | | 210/519 |
| 6,092,671 A * | 7/2000 | Ruehrwein | .......... | B01D 21/267 |
| | | | | 210/519 |
| 6,280,636 B1 * | 8/2001 | Locklair | ............. | B01F 3/04113 |
| | | | | 210/747.9 |
| 10,981,803 B2 * | 4/2021 | Hsieh | ........................ | C02F 3/24 |
| 2007/0289912 A1 * | 12/2007 | Pollock | .................. | B01D 21/06 |
| | | | | 210/197 |
| 2013/0186809 A1 * | 7/2013 | Featherstone | ...... | B01D 21/0003 |
| | | | | 210/97 |
| 2020/0308020 A1 * | 10/2020 | Hsieh | ........................ | C02F 3/20 |
| 2020/0308819 A1 * | 10/2020 | Hsieh | ........................ | E03F 5/10 |

OTHER PUBLICATIONS

Notice of Allowance of corresponding TW application 108111120, published on Mar. 20, 2020.

\* cited by examiner

COOLING APPARATUS OF REGULATING TANK

BACKGROUND OF THE INVENTION

1. Technical Field

The present invention relates to a wastewater treatment system, and more particularly to a cooling apparatus of a regulating tank.

2. Description of Related Art

Recycling of papers is getting more and more important in present days since shortage of natural resource is more and more serious. In order to separate fibers in waste paper and remove ink from fibers, it needs specified chemical solutions and water in aforesaid processes. As a result, it generates large amount of wastewater in the process of paper recycling.

Treatments of wastewater in paper recycling including coagulation process, biochemical process, and chemical process. Bacteria, such as anaerobic bacteria and aerobic bacteria, are used in biochemical process. Environment is deeply effects the works of bacteria, such as temperature and pH value of water. Typically, high temperature is bad for bacteria, and water temperature always increases in wastewater treatment. A conventional solution is adding chemical solution to help the works of bacteria instead of lowering the temperature. It only has limited effect.

BRIEF SUMMARY OF THE INVENTION

In view of the above, the primary objective of the present invention is to provide a regulating tank, which may lower water temperature and increase dissolved oxygen to help the works of aerobic bacteria in biochemical process.

In order to achieve the objective of the present invention, a regulating tank includes a tank member having an annular wall to receive wastewater; a circular pipe connected to the tank member; a draining device for draining the wastewater in the tank member to the circular pipe; and a plurality of nozzles connected to the circular pipe to eject the wastewater in the circular pipe back to the tank member.

In an embodiment, the draining device includes a water pump and a guiding pipe; the water pump pumps the wastewater in the tank member, and the guiding pipe has opposite ends connected to the water pump and the circular pipe.

In an embodiment, each of the nozzles is provided with a controller to open and close the nozzle by control.

In an embodiment, the regulating tank further includes a first overflow weir on an interior side of the annular wall of the tank member.

In an embodiment, the regulating tank further includes a first pump and a first return pipe; the first pump pumps the wastewater in the tank member, and the first return pipe has an end connected to the first pump and an opposite end associated with the first overflow weir.

In an embodiment, the second overflow weir is provided with a plurality of stop plates; the stop plates are separated from each other to form a flowing gap between each two of the neighboring stop plates.

In an embodiment, the regulating tank further includes a second overflow weir having a plurality of terminals associated with the first overflow weir to communicate the second overflow weir with the first overflow weir.

In an embodiment, the regulating tank further includes a second return pipe having an end connected to the circular pipe and an opposite end associated with the second overflow weir.

In an embodiment, the second overflow weir is provided with a plurality of stop plates; the stop plates are separated from each other to form a flowing gap between each two of the neighboring stop plates.

In an embodiment, the regulating tank further includes a frame connected to the tank member, wherein the second overflow weir is connected to the frame to be positioned over the tank member.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

A wastewater treatment system of the preferred embodiment of the present invention includes a primary settling tank and a regulating tank connected to the primary settling tank through pipes. In the present embodiment, the primary settling tank is higher than regulating tank, so that wastewater flows to regulating tank from the primary settling tank by gravity.

Figure 1:
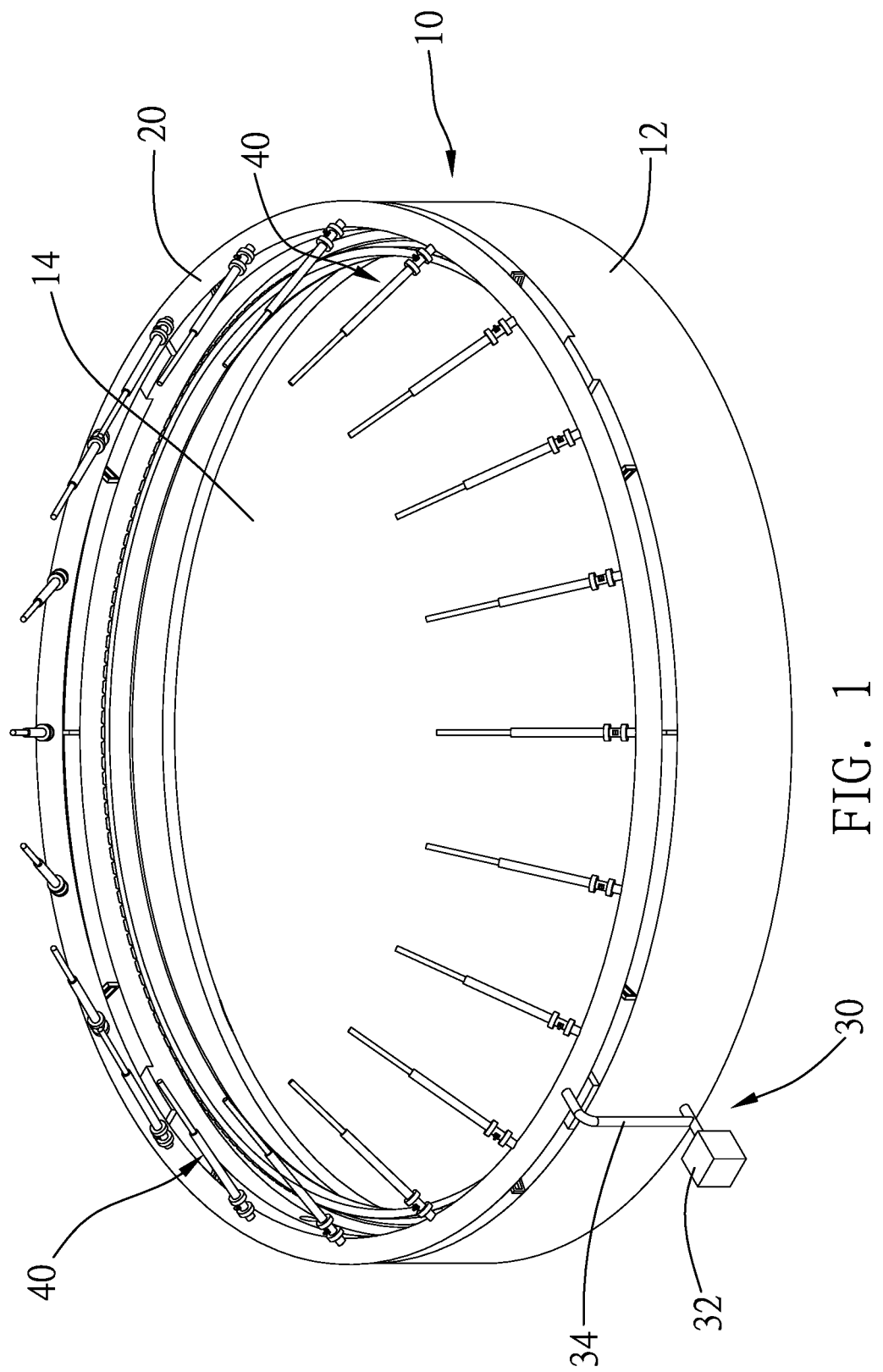
FIG. 1 is a perspective view of a preferred embodiment of the present invention.

As shown in FIG. 1, the regulating tank includes a tank member 10. The tank member 10 has an annular wall 12 and a bottom to enclose a chamber 14 therein to receive the wastewater from the primary settling tank.

A circular pipe 20 is fixed to a top edge of the annular wall 12 of the tank member 10. A draining device 30 having a first pump 32 and a first guiding pipe 34. The first guiding pipe 34 has opposite ends connected to the first pump 32 and the circular pipe 20. The first pump 32 pumps the wastewater in the tank member 10 to the circular pipe 20 through the first guiding pipe 34.

A plurality of nozzles 40 are connected to the circular pipe 20 with specified angles to eject the wastewater in the circular pipe 20 into the tank member 10.

The first pump 32 pumps the wastewater in the tank member 10 to the circular pipe 20 through the first guiding pipe 34, and then the nozzles 40 eject the wastewater into the tank member 10 to create a water circulation and disturb the wastewater in the tank member 10. When the wastewater is ejected by the nozzles 40, a temperature of the wastewater is reduced, and a dissolved oxygen of the wastewater is increased.

Figure 2:
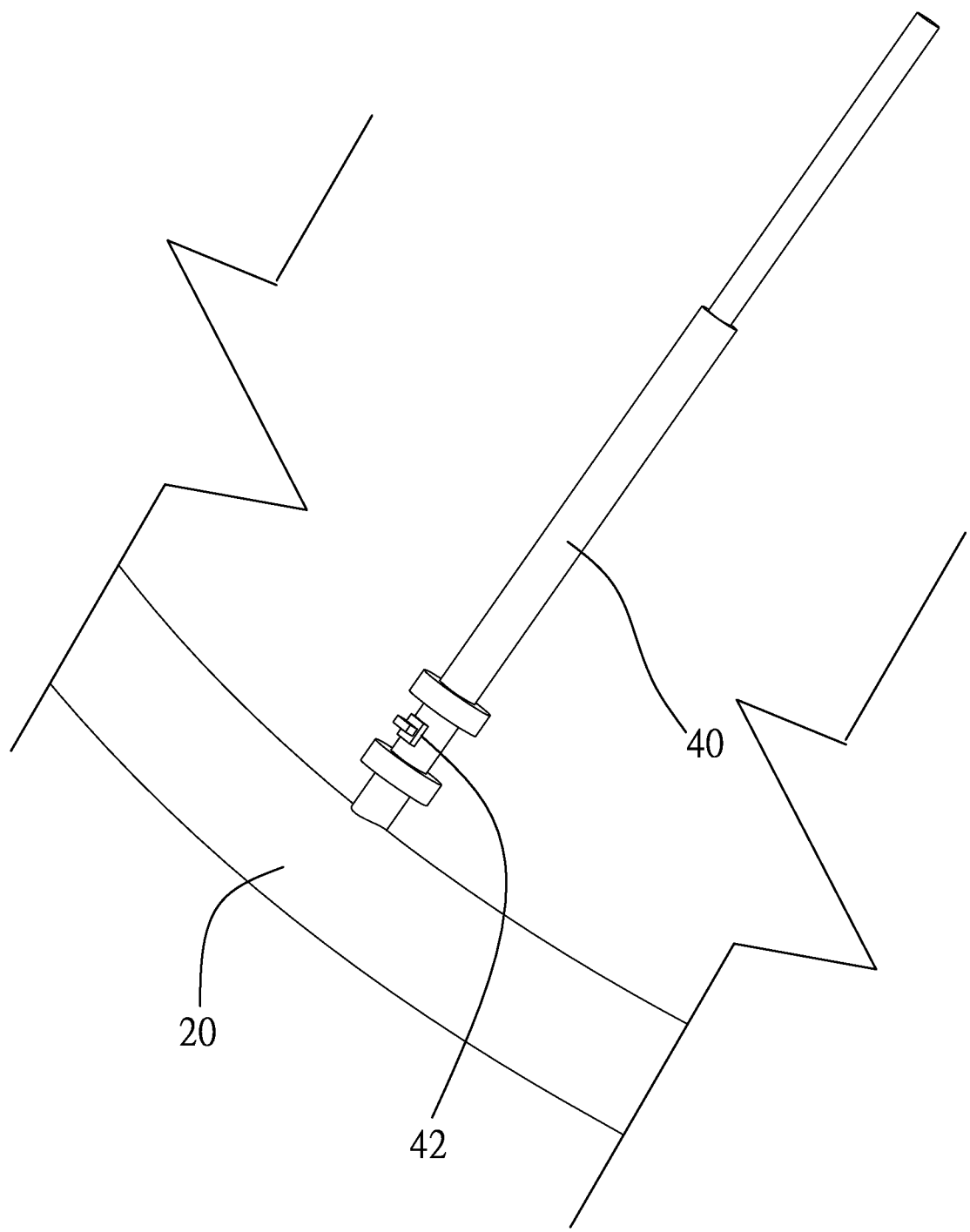
FIG. 2 is a perspective view of the nozzle of the preferred embodiment of the present invention.

As shown in FIG. 2, each of the nozzles 40 is provided with a controller 42, and the controllers 42 controls the nozzles 40 to open and closed to control the time and quantity of the wastewater ejected by the nozzles 42.

Figure 3:
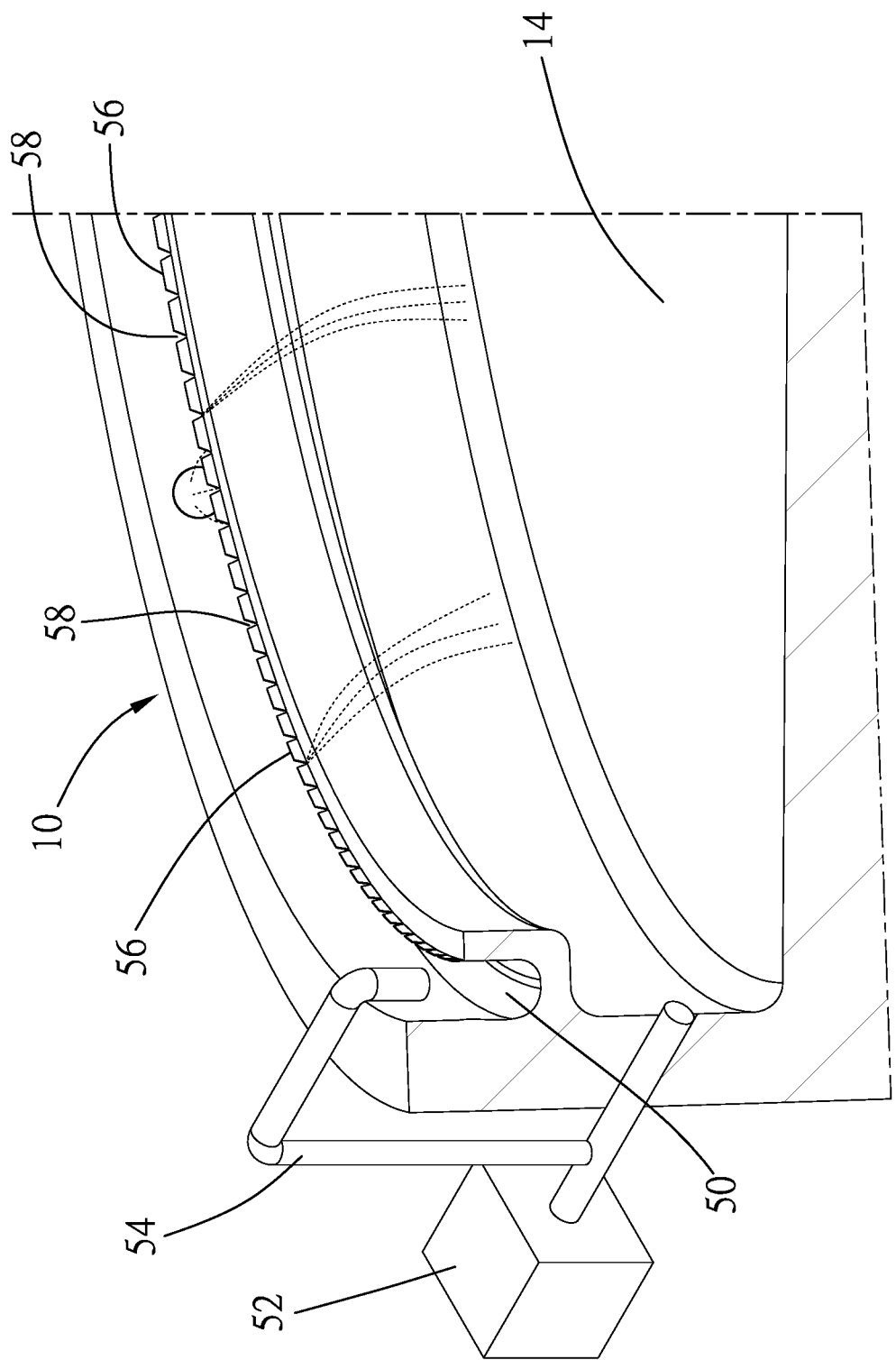
FIG. 3 is a sectional view in part of the preferred embodiment of the present invention, showing the first overflow weir.

As shown in FIG. 3, the regulating tank further includes a first overflow weir 50 on an interior side of the annular wall 12. The wastewater from the primary settling tank flows to the first overflow weir 50, and then flows to the chamber 14 of the tank member 10. The regulating tank further includes a water pump 52 and a first return pipe 54. The water pump 52 pumps the wastewater in the chamber 14 to the first overflow weir 16 through the first return pipe 24.

The first overflow weir 50 is provided with a plurality of stop plates 56. The stop plates 56 are separated from each other to form a flowing gap 58 between each two of the neighboring stop plates 56. The wastewater flows back to the tank member 10 through the flowing gaps 58 of the first overflow weir 50.

Figure 4:
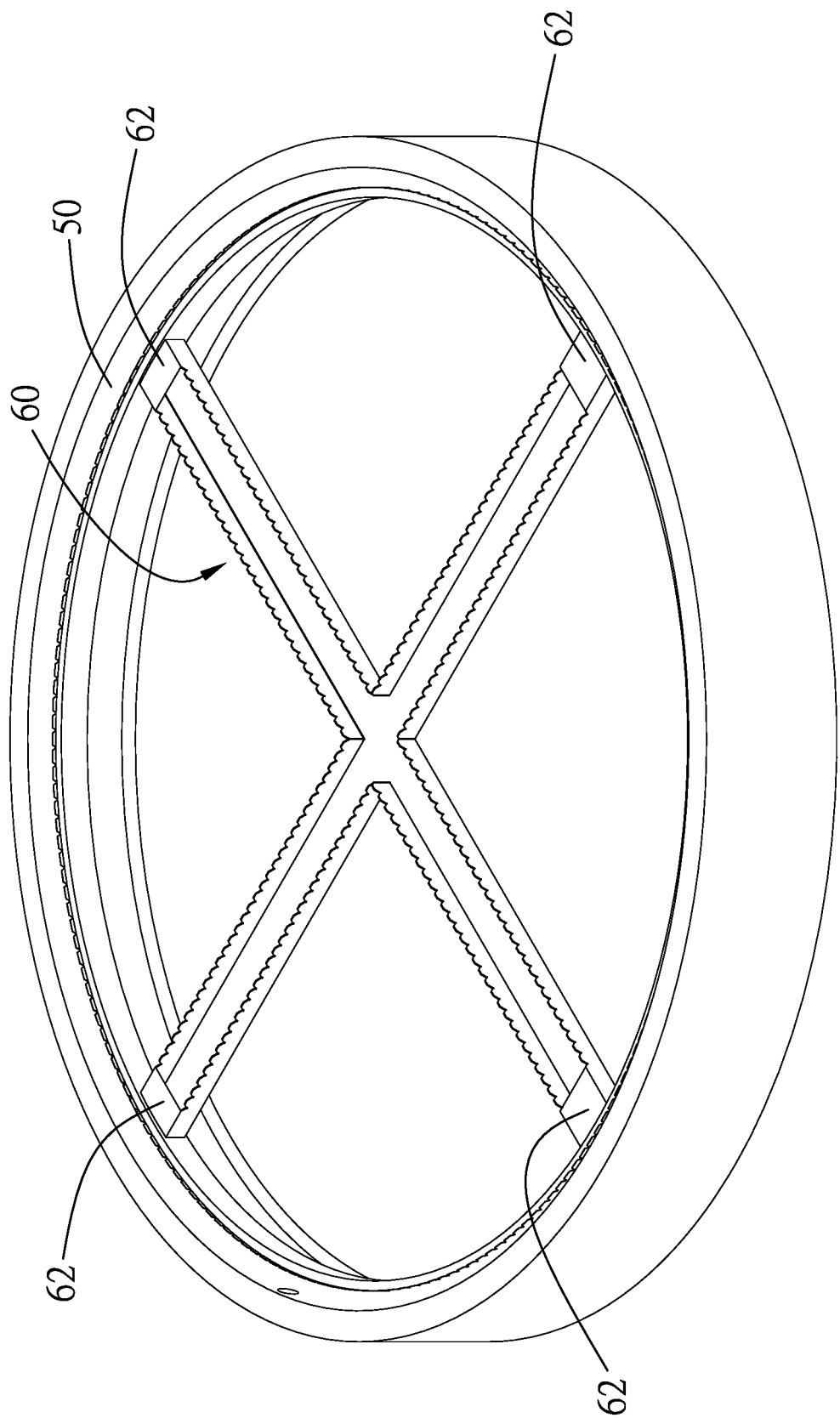
FIG. 4 is a perspective view in part of the preferred embodiment of the present invention, showing the second overflow weir.
Figure 5:
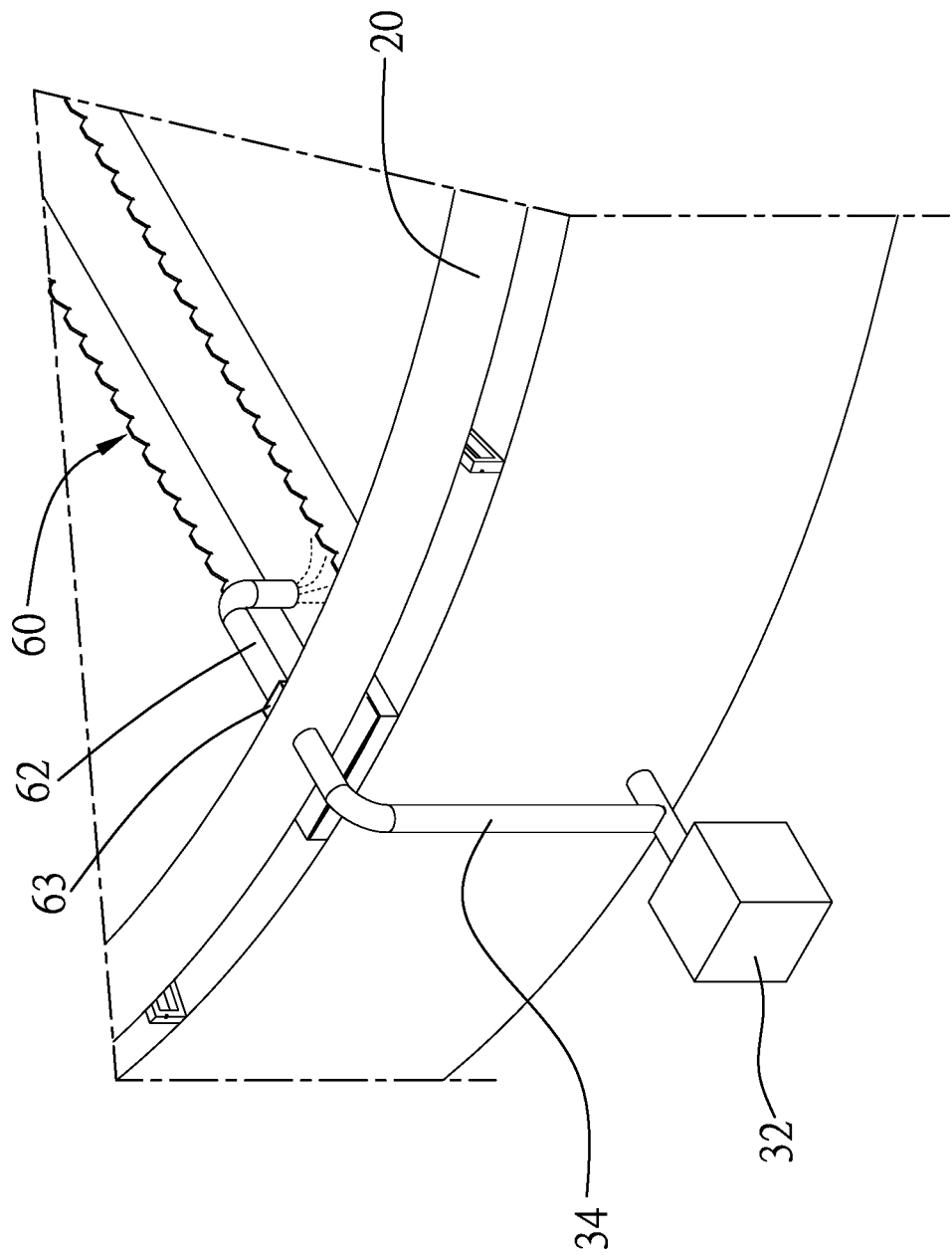
FIG. 5 is a perspective view in part of the preferred embodiment of the present invention, showing the second pump device.

As shown in FIG. 4, the regulating tank further includes a second overflow weir 60, which has a plurality of terminals 62 communicated with the first overflow weir 50. As a result, the wastewater may flow from the first overflow weir 50 to the second overflow weir 60. As shown in FIG. 5, a second return pipe 62 has an end connected to the circular pipe 20 and an opposite end associated with the second overflow weir 60. As a result, the water pump 32 pumps the wastewater to the circular pipe 20, and the wastewater in the circular pipe 20 may flows back to the tank member 10 through the second return pipe 62 and the second overflow weir 60 in sequence.

As shown in FIGS. 4 and 5, the wastewater flows to second overflow weir 60 via the draining device 30 and the second return pipe 62, and then the wastewater flows back the tank member 10 from the second overflow weir 60. It may reduce the temperature of the wastewater and increase the dissolved oxygen of the wastewater.

Figure 6:
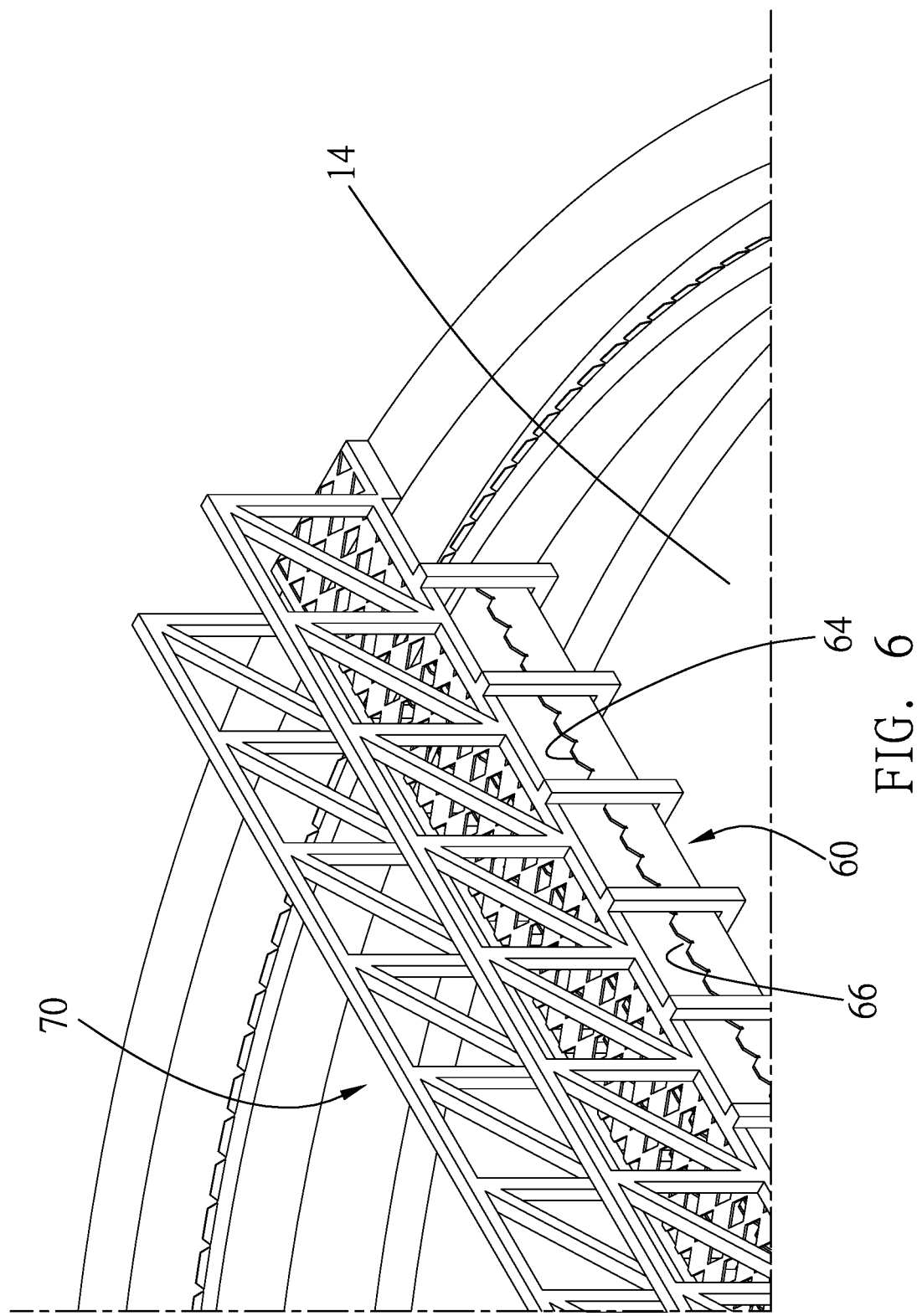
FIG. 6 is a perspective view in part of the preferred embodiment of the present invention, showing the frame and the second overflow weir.

As shown in FIG. 6, the second overflow weir 60 is provided with a plurality of stop plates 64. The stop plates 64 are separated from each other to form a flowing gap 66 between each two of the neighboring stop plates 64. The wastewater flows back to the tank member 10 through the flowing gaps 66 of the second overflow weir 60. The regulating tank further includes a frame 70 has ends connected to the tank member 10. The frame 70 is above the second overflow weir 60 and connected to the second overflow weir 60. The frame 70 has a cross shape as the second overflow weir 60, and four ends of the frame 70 are fixed to the tank member 10 to make the frame 70 cross over the tank member 10. The second overflow weir 60 is hung under the frame 70 to position the second overflow weir 60 over the tank member 10.

The second return pipe 62 is provided with a control valve 53 to open or close the second return pipe 62. It may control the time and quantity of the wastewater flows out of the second return pipe 62.

In conclusion, the wastewater in the tank member 10 disturbed by the nozzles 52, and the first and the second overflow weir 50, 60. When the wastewater is exposed in the air, it may reduce the temperature of the wastewater and increase the dissolved oxygen of the wastewater. It is helpful to the works of aerobic bacteria.

It must be pointed out that the embodiments described above are only some preferred embodiments of the present invention. All equivalent structures which employ the concepts disclosed in this specification and the appended claims should fall within the scope of the present invention.

What is claimed is:

1. A regulating tank, comprising:
   a tank member having an annular wall to receive wastewater, wherein a first overflow weir is provided on an interior side of the annular wall;
   a circular pipe connected to the tank member;
   a second overflow weir having a plurality of terminals to fluidly communicate the second overflow weir with the first overflow weir;
   a frame connected to the tank member, wherein the second overflow weir is connected to the frame to be positioned over the tank member;
   a draining device for draining the wastewater in the tank member to the circular pipe; and
   a plurality of nozzles connected to the circular pipe in predetermined angles to eject the wastewater in the circular pipe back to the tank member.

2. The regulating tank of claim 1, wherein the draining device includes a water pump and a guiding pipe; the water pump pumps the wastewater in the tank member, and the guiding pipe has opposite ends connected to the water pump and the circular pipe.

3. The regulating tank of claim 1, wherein each of the nozzles is provided with a controller to open and close the nozzle by control, wherein the controllers are provided on ends of the nozzles and connected to the circular pipe.

4. The regulating tank of claim 1, further comprising a first pump and a first return pipe; the first pump pumps the wastewater in the tank member, and the first return pipe has an end connected to the first pump and an opposite end to drain the wastewater in the tank member to the first overflow weir.

5. The regulating tank of claim 1, wherein the second first overflow weir is provided with a plurality of stop plates; the stop plates are separated from each other to form a flowing gap between each two of the neighboring stop plates.

6. The regulating tank of claim 1, further comprising a second return pipe having an end connected to the circular pipe and an opposite end to flow the wastewater in the circular pipe to the second overflow weir.

7. The regulating tank of claim 5, wherein the second overflow weir is provided with a plurality of stop plates; the stop plates are separated from each other to form a flowing gap between each two of the neighboring stop plates.

* * * * *